(12) United States Patent
Lu et al.

(10) Patent No.: US 9,727,653 B2
(45) Date of Patent: Aug. 8, 2017

(54) SYSTEM AND METHOD FOR IDENTIFYING AND RANKING USER PREFERENCES

(75) Inventors: Tian Lu, Toronto (CA); Craig Edgar Boutilier, Toronto (CA)

(73) Assignee: Google Inc., Mountain View, CA (US)

( * ) Notice: Subject to any disclaimer, the term of this patent is extended or adjusted under 35 U.S.C. 154(b) by 349 days.

(21) Appl. No.: 14/001,984

(22) PCT Filed: Mar. 8, 2012

(86) PCT No.: PCT/CA2012/000229
§ 371 (c)(1),
(2), (4) Date: Nov. 28, 2013

(87) PCT Pub. No.: WO2012/119245
PCT Pub. Date: Sep. 13, 2012

(65) Prior Publication Data
US 2014/0181102 A1   Jun. 26, 2014

Related U.S. Application Data

(60) Provisional application No. 61/450,286, filed on Mar. 8, 2011.

(51) Int. Cl.
*G06F 17/30* (2006.01)
*G06N 7/00* (2006.01)
*G06Q 30/02* (2012.01)

(52) U.S. Cl.
CPC ....... *G06F 17/30867* (2013.01); *G06N 7/005* (2013.01); *G06Q 30/0201* (2013.01)

(58) Field of Classification Search
CPC ......... G06F 17/30867; G06F 17/30035; G06F 17/3069; G06N 7/005; G06Q 30/0201
USPC .......................................... 707/723, 748–750
See application file for complete search history.

(56) References Cited

U.S. PATENT DOCUMENTS

2008/0010226 A1   1/2008   Brinker et al.
2014/0081717 A1*  3/2014   Lu et al. ................. 705/12

OTHER PUBLICATIONS

Guy Lebanon et al., Non-Parametric Modeling of Partially Ranked Data, Google, 2007, 1-8.*
Ioannis Mitliagkas et al., User rankings from comparisons: Learning permutations in high dimensions, Sep. 28-30, 2011, 1143-1150.*
Patent Cooperation Treaty, International Search Report and Written Opinion dated May 16, 2012, issued on PCT Application No. PCT/CA2012/000229.
Lu, T. et al., Learning Mallows Models with Pairwise Preferences, Proceedings of the 28th International Conference on Machine Learning (ICML), May 4, 2011, pp. 145-152.
Lu, T. et al., The Unavailable Candidate Model: A Decision-Theoretic View of Social Choice, EC'10 Proceedings of the 11th ACM Conference on Electronic Commerce, Jun. 7, 2010, pp. 1-11.

(Continued)

*Primary Examiner* — Jean B Fleurantin
(74) *Attorney, Agent, or Firm* — Fish & Richardson P.C.

(57) ABSTRACT

Methods and systems for learning models of the preferences of members drawn from some population or group, utilizing arbitrary paired preferences of those members, in any commonly used ranking model are disclosed. These methods and systems utilize techniques for learning Mallows models, and mixtures thereof, from pairwise preference data.

17 Claims, 5 Drawing Sheets

(56) References Cited

OTHER PUBLICATIONS

Burges, From RankNet to LambdaRank to LambdaMART: An overview. TR-2010-82, Microsoft Research, Jun. 2010, pp. 1-19.
Busse et al., "Cluster analysis of heterogeneous rank data," Proceedings of the 24th international conference on Machine learning, pp. 113-120, 2007.
Cheng et al., "Label ranking methods based on the Plackett-Luce model," Proceedings of the $27^{th}$ International Conference on Machine Learning, pp. 215-222, 2010.
Doignon et al., "The repeated insertion model for rankings: Missing link between two subset choice models," Psychometrika, 69(1):33-54, Mar. 2004.
Dwork et al., "Rank aggregation: methods for the web," Proceedings of the $10^{th}$ international conference on World Wide Web, pp. 613-622, May 2001.
Ghahramani et al., "Learning from incomplete data," MIT Artificial Intelligence Memo No. 1509, Paper No. 108, Dec. 1994, 12 pages.
Guiver and Snelson, "Bayesian inference for Plackett-Luce ranking models," ICML-09, pp. 377-384, Jun. 2009.
Kamishirna et al., "Supervised ordering—an empirical survey," Data Mining, Fifth IEEE International Conference on, pp. 673-676, Nov. 2005.
Louviere et al., "Stated Choice Methods: Analysis and Application," Cambridge, 2000, 30 pages.
Luce, "Individual choice behavior: A theoretical analysis," Wiley, 1959, 176 pages.
Mallows, "Non-null ranking models," Biometrika, 44(1/2):114-130, Jun. 1957.
Marden, "Analyzing and Modeling Rank Data," Chapman and Hall, 1995.
Murphy and Martin, "Mixtures of distance-based models for ranking data," Computational Statistics and Data Analysis, 41(3-4):645-655, Jan. 28, 2003.
Neal and Hinton, "A view of the EM algorithm that justifies incremental, sparse, and other variants," Learning in Graphical Models, pp. 355-368. MIT Press, Cambridge, MA, 1999.
Plackett, "The analysis of permutations," Applied Statistics, 24(2):193-202, 1975.
Salakhutdinov et al., "Probabilistic Matrix Factorization," Proc. Advances in Neural Information Processing Systems 20 (NIPS 07), ACM Press, 2008, pp. 1257-1264.
Young, "Optimal voting rules," J Economic Perspectives, 9(1):51-64, 1995.

\* cited by examiner

| r | Insert $a, b$ Insrt. Prob. | r | Insert $c$ given $ab$ Insrt. Prob. | r | Insert $c$ given $ba$ Insrt. Prob. |
|---|---|---|---|---|---|
| a | $P(j_a = 1) = 1$ | cab | $P(j_c = 1) = 0$ | cba | $P(j_c = 1) = 0$ |
| ab | $P(j_b = 1) = \frac{1}{1+\emptyset}$ | acb | $P(j_c = 2) = \frac{\emptyset}{1+\emptyset}$ | bca | $P(j_c = 2) = 0$ |
| ba | $P(j_b = 2) = \frac{\emptyset}{1+\emptyset}$ | abc | $P(j_c = 3) = \frac{1}{1+\emptyset}$ | bac | $P(j_c = 3) = 1$ |

SYSTEM AND METHOD FOR IDENTIFYING AND RANKING USER PREFERENCES

FIELD OF INVENTION

This invention relates in general systems and methods for identifying and ranking user preferences.

BACKGROUND OF THE INVENTION

The prevalence of Internet commerce, social networking, and web search in recent years has produced a wealth of data about the preferences of individual users of such services. Various solutions have been inspired by work in the fields of statistics and machine learning that provide automated mechanisms to find exploitable patterns in such data. The exploitable patterns may be used to ultimately provide better recommendations of products, services, information, social connections, and other options or items to individuals (or groups of individuals). The increased quality of recommendations provided improves user experience, satisfaction, and uptake of these services.

With the abundance of preference data from search engines, review sites, etc., there is tremendous demand for learning detailed models of user preferences to support personalized recommendation, information retrieval, social choice, and other applications. Much work has focused on ordinal preference models and learning user or group "rankings" of items. Two classes of models are distinguishable. A first model may wish to learn an underlying objective (or "correct") ranking from noisy data or noisy expressions of user preferences (e.g., as in web search, where user selection suggests relevance). A second model may assume that users have different "types" with inherently distinct preferences, and aim to learn a population model that explains this diversity. Learning preference types (e.g., by segmenting or clustering the population) can be critical to effective personalization and preference elicitation: e.g., with a learned population preference distribution, choice data from a specific user allows inferences to be drawn about her preferences.

One aspect of research in this domain has focused on leveraging product ratings (typically given on a small, numerical scale), and users' profile data to predict the missing ratings or preferences of individual users (e.g., how much will user A like a movie M that she has not yet seen). This is known as "collaborative filtering", because the prediction algorithms aggregate the collective, and usually partial, preferences of all users. These approaches take into the account the diversity of preferences across users. See for example, papers "Probabilistic Matrix Factorization" by R. Salakhutdinov and A. Mnih, Neural Information Processing Systems 2008 and "Learning from incomplete data" by Z. Ghahramani and Michael I. Jordan, MIT Artificial Intelligence Memo No. 1509. There are a variety of commercially relevant recommender systems based on collaborative filtering.

Considerable work in machine learning has exploited ranking models developed in the statistics and psychometrics literature, such as the Mallows model (Mallows, 1957), the Plackett-Luce model (Plaskett, 1975; Luce, 1959), and others (Marden, 1995). This work involves learning probability distributions over ranking preferences of a user population. The models investigated in this line of research are usually derived from models proposed in the psychometric and statistics literature and include the Mallows model, the Plackett-Luce model, the Thurstonian model and several others (See: J. I. Marden, "*Analyzing and Modeling Rank Data*", Chapman and Hall, 1995). The Mallows model has attracted particular attention in the machine learning community.

However, research to date provides methods for learning preference distributions using very restricted forms of evidence about individual user preferences, ranging from full rankings, to top-t/bottom-t items, to partitioned preferences (Lebanon & Mao, 2008). Missing from this list are arbitrary pairwise comparisons of the form "a is preferred to b." Such pairwise preferences form the building blocks of almost all reasonable evidence about preferences, and subsumes the most general evidential models proposed in the literature. Furthermore, preferences in this form naturally arise in active elicitation of user preferences and choice contexts (e.g., web search, product comparison, advertisement clicks), where a user selects one alternative over others (Louviere et al., 2000).

While learning with pairwise preferences is clearly of great importance, most believe that this problem is impractically difficult: so, for instance, the Mallows model is often shunned in favour of more inference-friendly models (e.g., the Plackett-Luce model, which accommodates more general, but still restrictive, preferences (Cheng et al., 2010; Guiver & Snelson, 2009)). To date, no methods been proposed for learning from arbitrary paired preferences in any commonly used ranking model.

Examples of relevant prior art include: Amazon.com, which recommends consumer products based on past purchases, product details viewed and other relevant features; and Netflix.com, which recommends movies primary based on movie ratings on a predefined scale.

Another aspect that has been the subject of prior art research is finding an objective, or ground truth, and ranking of items based on expert relevance ratings or (noisy) user feedback in the form of comparisons on pairs of items. Algorithms for this problem have typically been applied in the domain of web search engines, where an objective ranking must be outputted for a given user search query. Some relevant papers on this subject are referenced below and in the paper Tyler Lu & Craig Boutilier, "*Learning Mallows Models with Pairwise Preferences.*" Notably, such algorithms have been applied in large commercial search engines such as Google™, and Microsoft Bing™.

Much of the prior art has focused on learning (i.e., inferring parameters) for such models or mixtures thereof (i.e., several Mallows distributions combined together, each forming a cluster) given very restrictive forms of preferences used as evidence/observations from which the model is to be learned. Existing prior art techniques require, for example, that observations of user preferences take the form of a full ranking, a partial ranking consisting of the top few items, and other such variations. Relevant prior art references include the following:

Burges, C. From ranknet to lambdarank to lambdamart: An overview. TR-2010-82, Microsoft Research, 2010.

Busse, L. M., Orbanz, P. and Buhmann, J. M. Cluster analysis of heterogeneous rank data. ICML, pp. 113-120, 2007.

Cheng, W., Dembczynski, K., and Hüllermeier. Label ranking methods based on the Plackett-Luce model. ICML-10, pp. 215-222, Haifa, 2010.

Dokgnon, J., Pekec, A., and Regenwetter, M. The repeated insertion model for rankings: Missing link between two subset choice models. *Psychometrika*, 69(1):33-54, 2004.

Dwork, C., Kumar, R., Naor, M., and Sivakumar, D. Rank aggregation methods for the web. WWW-01, pp. 613-622, Hong Kong, 2001.

Guiver, J. and Snelson, E. Bayesian inference for Plackett-Luce ranking models. ICML-09, pp. 377-384, 2009.

Kamishima, T., Kazawa, H., and Akaho, S. Supervised ordering: an empirical survey. IEEE Data Mining-05, pp. 673-676, 2005.

Lebanon, G. and Mao, Y. Non-parametric modeling of partially ranked data. J. Machine Learning Research, 9:2401-2429, 2008.

Louviere, J., Hensher, D., and Swait, J. *Stated Choice Methods: Analysis and Application*. Cambridge, 2000.

Luce, R. D. *Individual choice behavior: A theoretical analysis*. Wiley, 1959.

Mallows, C. L. Non-null ranking models. *Biometrika*, 44:114-130, 1957.

Marden, J. I. *Analyzing and modeling rank data*. Chapman and Hall, 1995.

Murphy, T. B. and Martin, D. Mixtures of distance-based models for ranking data. *Computational Statistics and Data Analysis*, 41:645-655, 2003.

Neal, R. and Hinton, G. A view of the EM algorithm that justifies incremental, sparse, and other variants. In Jordan, M. (ed.), *Learning in Graphical Models*, pp. 355-368. MIT Press, Cambridge, Mass., 1999.

Plackett, R. The analysis of permutations. *Applied Statistics*, 24:193-202, 1975.

Young, P. Optimal voting rules. *J. Economic Perspectives*, 9:51-64, 1995.

SUMMARY OF THE INVENTION

In one aspect of the invention, a computer implemented method is provided for identifying and ranking preferences regarding a plurality of options, for a group including two or more members, the method comprising: (a) obtaining from one or more data sources, preference information, including partial preference information, for the members, or a subset of the members, wherein the partial preference information may include a set of pairwise comparisons involving one or more of the options; (b) analyzing, by operation of one or more server computers, the pairwise comparisons so as to learn one or more statistical models for inferring and ranking a set of preferences based on the partial preference information; and (c) applying the one or more statistical models so as to identify the set of preferences and rank the options.

In another aspect, the one or more statistical models are selected to fit with the partial preference information.

In yet another aspect, a plurality of mixtures of statistical models for inferring and ranking preferences is selected, thus enabling the formation of clusters consisting of probabilistic distributions applied to segments of the group.

In another aspect, the method includes a further step of automatically determining (i) a series of model parameters that best fit the available preference information for selecting one or more statistical models that best fits the preference information, and (ii) based on the model parameters, selecting one or more applicable statistical models.

In another aspect, the method enables prediction of unobserved preferences of specific members.

In a still other aspect, the one or more statistical models include a Mallows model for specifying a probability distribution over a ranking of the choices.

In yet another aspect, the Mallows model is specified by a mean ranking reflecting the average preferences of the group plus a dispersion parameter representing the variability of preferences in the group.

In a still other aspect, the preference information is obtained from one or more of: (a) user ratings or comparisons of products/services on an explicit basis; (b) user actions such as product selections, social media interactions or clicking on web links, past survey responses, on an implicit basis.

In yet another aspect, the model parameters are inferred given observations of user behavior, survey data, or implicit choice data, and the model parameters consists of inferred clusters of users, or preference types, based on partial preference data.

In a still other aspect, a computer network implemented system is provided for identifying and ranking preferences regarding a plurality of options, for a group including two or more members, the system comprising: (a) one or more server computers, connected to an interconnected network of computers, and linked to a server application; (b) the server application includes or is linked to an preference inference engine that: (i) obtains from one or more data sources linked to the one or more server computers, preference information, including partial preference information, for the members, or a subset of the members, wherein the partial preference information may include a set of pairwise comparisons involving one or more of the options; (ii) analyzing the pairwise comparisons so as to learn one or more statistical models for inferring and ranking a set of preferences based on the partial preference information; and (iii) applying the one or more statistical models so as to identify the preferences and rank the set of options.

In yet another aspect, the one or more statistical models are selected to fit with the partial preference information.

In another aspect, the server application is operable to automatically determining (i) a series of model parameters that best fit the available preference information for selecting one or more statistical models that best fits the preference information, (ii) based on the model parameters selecting one or more applicable statistical models, (iii) the inference engine applying the selected one or more applicable statistical models so as to infer a preference set or preference ranking.

In yet another aspect of the invention, the inference engine is operable to predict unobserved preferences of specific members.

In yet another aspect, the one or more statistical models include a Mallows model for specifying a probability distribution over a ranking of the choices.

In another aspect, the Mallows model is specified by a mean ranking reflecting the average preferences of the group plus a dispersion parameter representing the variability of preferences in the group.

In a still other aspect of the method, a further step includes identifying the preferences enables the prediction of the preferences, and using the pairwise preferences and application of a Mallows model/mixture.

In another aspect of the invention, the system is operable to enable the prediction of the preferences, by applying a Mallows model/mixture to the pairwise references.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

One aspect of the invention is a novel and innovative way of learning probabilistic distributions over ranking preferences of a user population based on one or more ranking models. Various ranking models exist and these generally enable the determination of ranking choices within a population of interest (such as a defined user base or a target market), and also optionally the segmentation of the population of interest based on participation in different probabilistic distributions.

One example of a common ranking model is the so-called Mallows model although other ranking models exist such as for example the Plaskett-Luce model, the Thurstonian model and several others (see the book "Analyzing and Modeling Rank Data" by J. I. Marden).

In one aspect of the invention, a novel and innovative method and system is provided for inferring the parameters of one or more statistical models for inferring and ranking preferences (such as known ranking models). In another aspect, the method and system enables inference of a plurality of mixtures of statistical models for inferring and ranking preferences, thus enabling the formation of clusters consisting of probabilistic distributions applied to segments of the population.

Mixtures of Mallows models may consist of a variable number of Mallows models, each associated with a weight. Mixture models may be more flexible, allowing for representation of different segments of the user population whose preferences may be more distinct than permitted by a single model.

A population may also be referred to a "group", and the segments or sub-population may also be referred to as "sub-groups".

Existing techniques generally require that the preference information (which may also be understood as choice information) meet specific requirements such as (i) that there be a full ranking, (ii) a partial ranking consisting of the top few items, or (iii) other various as set out in the paper entitled "Learning Mallows Models with Pairwise Preference" for a thorough discussion (listed in the references).

Yet preference information that is most widely available, for example that can be obtained explicitly from user ratings or comparisons of products/services, or implicitly from user actions like product selection, social media interactions, "check in" using location-aware services like FourSquare™ or Facebook™, or simple clicks on links (e.g., of different search results, advertisements, or news items, etc.) generally does not meet these specific requirements. It should be understood that this information may be obtained from one or more data sources that are connected to a server computer that implements the operations of the present invention, for example as an Internet service.

This widely available information generally consists of partial preference information, which may be expressed as a set of pairwise comparisons over alternatives (items, products, options, information, web/search results etc.). Each pairwise comparison may be represented for example in the form of "I prefer item A to item B". This is in contrast to the full ranking or partial ranking with a plurality of top ranked items, as referenced above.

While preference information in this form is widely available, referred to as "partial preference information", the use of such partial preference information for learning one or more statistical models for inferring and ranking preferences in a given population is not considered to be computationally feasible based on prior art solutions.

In a first aspect of the present invention, the inventors realized that one or more statistical models for inferring and ranking preferences may be learned using partial preference information if the partial preference information is expressed as pairwise comparisons.

In a second aspect of the invention, a plurality of particular methods are provided that enabling learning of one or more applicable statistical models for inferring and ranking preferences by automatically determining (i) a series of model parameters that best fit the available preference information for selecting one or more statistical models that best fits the available preference information, and (ii) based on the model parameters selecting one or more applicable statistical models. The statistical models may then be used to make predictions about the unobserved preferences of specific users, and to make decisions such as product recommendations based on the predictions.

In another aspect of the invention, a method is provided that utilizes a Mallows model (as a particular example of a common statistical model for inferring and ranking preferences) to specify a probability distribution over the ranking of the items. This ranking is operable to represent the preferences of a random user, with higher ranked items being more preferred. The Mallows model specifies the probability that a randomly selected user from a population of interest will have a specific preference ranking. More specifically, suppose a collection of items (e.g. products) given a population of interest (e.g., a target market). Given a ranking r of these items, reflecting an ordering of preferences associated with the collection of items, the Mallows model describes the probability with which a random user has preferences represented by r. The Mallows model is specified by a mean ranking reflecting the "average preferences" of the population plus a dispersion parameter representing the variability of preferences in the population.

In another aspect of the invention, a plurality of different Mallows models may be utilized (or a "mixture" of Mallows models) that segment the population into sub-populations, each having a corresponding Mallows model. Each sub-population so generated consists of a cluster, segment, or group of users who have similar preferences. Within each cluster, a group member's true preference ranking is a random perturbation of the average preference ranking of that group. Mixtures of Mallows models are generally more flexible, allowing one to represent different segments of the user population whose preferences are much more distinct than permitted by a single model.

The model parameters, in accordance with another aspect of the invention, are inferred given observations of user behavior, survey data, implicit choice data, etc. The model parameters consist of inferred clusters of users, or preference types, based on partial preference data. Prior to present invention, no mechanism was known in order to generate these model parameters based on pairwise comparisons or arbitrary choice data.

In one aspect of the invention, a key operation for generating the model parameters consists of approximately sampling rankings from a Mallows distribution conditioned on observed choice data. This operation may be implemented using a sampling algorithm. The sampling algorithm is used to generate a plurality of samples to optimize the model parameters, thereby maximizing the degree of statistical fit. Further details are provided below.

It should be understood that the learning operations are unique and innovative, as are the sampling techniques used in conjunction with the learning operations.

In a particular implementation, the invention provides, in one aspect, one or more operations (which may be implemented using suitable algorithms) that relate to the generalized repeated insertion model (GRIM), for sampling from arbitrary ranking distributions. The present invention may also include operations (which may be implemented using suitable algorithms or other calculations) for evaluating log-likelihood, learning Mallows mixtures, and non-parametric estimation.

It should be understood that the techniques described may also be used for the purpose of generating an approximation to the true probability distribution in a variety of domains. Two experiments conducted using these techniques are explained below, using real-life data sets that demonstrate that the techniques described herein may effectively and efficiently learn good population preference models. The first data set utilized in the experiments consists of the elicited preferences of five thousand people for ten varieties of sushi. The second data set consists of the movie preferences of six thousand users, each giving ratings of movies they liked/disliked. Application of the present invention utilizing these data sets may produce results that reveal interesting preference patterns, as discussed below.

In one aspect of the invention, methods and systems are provided that enable the use of partial preferences to revise a particular individual's (full) preference ranking distribution, which can be used for example for inferring preference, e.g. in generating personalized recommendations.

The present invention may include the use of approximate samplers that are exact for many important special cases—and have provable bounds with pairwise evidence.

It should be understood that the present invention may be used for offline operation as well, for example in connection with a computer system used for discovering preferences based on partial preference information. It should be understood that the present invention enables a method of making preferences about one or more specific members of a target population given pairwise preference information about that specific member of the population, relative to the statistical models applicable at the population level. These methods may be embodied in a computer implemented system of the present invention, which may be implemented for example using the inference engine described below.

System Implementation

The system of the present invention may consist of a computer network implemented inference service or engine that is configured to (i) utilize partial preference information, (ii) apply one or more operations for selecting one or more applicable statistical models based on the method as described above, and (iii) apply the one of more statistical models so as to generate one or more outputs.

The partial preference information may be obtained from a variety of entities (including human and computer entities such as software agents, input provided by users using an input means (for example a web page) or online or offline databases, opinion or review sites, or social networking sites.

Preferences may be elicited in a number of ways, by one or more queries posed to a member of a group about their pairwise preferences.

In an aspect of the invention, the system may be implemented by one or more server Computers, connected to an interconnected network of computers, and linked to a server application. The system may also be implemented as part of a cloud service that is part of a cloud computing network.

The computer program of the present invention, in one aspect thereof, may be implemented as a server application, whether linked to one or more server computers or to the cloud service. The computer program may also be linked to or integrated with various other platforms or services that may benefit from the preference inference operations of the present invention. One example of an implementation of the present invention is shown in FIG. 4.

The present invention may be understood as providing an online inference service for inferring preferences for a population, and for dynamically generating preference clusters that may define sub-populations that are associated with the generated preference clusters. The online service may be configured in a variety of ways known to those skilled in the art, so as to embody the operations described herein.

Figure 4:
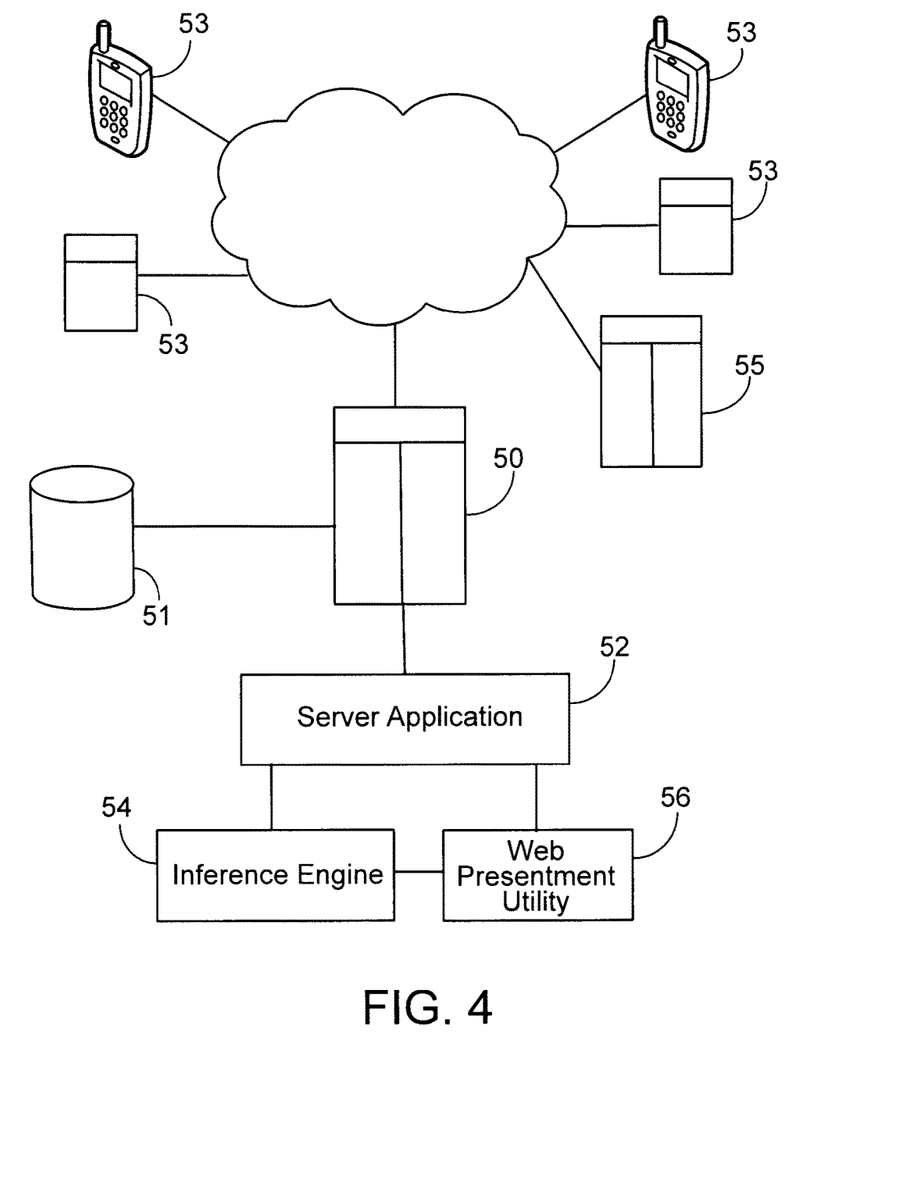
FIG. 4 is a system diagram illustrating a representative implementation of the present invention.

In one implementation of the invention the computer system may be implemented for example, as shown in FIG. 4. The computer system may include for example a server computer (50), but may include one or more linked server computers, a distributed computer architecture, or a cloud computing environment. The server computer (50) is linked to a server application (52). The server application (52) includes functionality for enabling the operations described herein. In one aspect of the invention, the server application (52) includes or is linked to an inference engine (54) that is operable to implement one or more operations that implement the learning procedure herein. The server application (52) may include a web presentment utility (56) that is operable to present one or more web pages that include a user interface for example for providing access to the output from the inference engine (54).

Also, as previously described preference information may be obtained from a variety of data sources, including for example online or offline databases, product review websites, social networking websites, location-aware applications or services, applications (including mobile applications) and so on.

The server application (52), in one implementation, may also include for example one or more filters for detecting if preference information may not be expressed as pairwise preference. Additionally, the server application (52) may include programming that is operable to extrapolate pairwise preferences from preference information provided in other forms. Additional the server application (52) may include logic for generating all of the pairwise preferences that may be implied from particular preference input information.

A skilled reader will recognize that there are a variety of implementations of the present invention. The following provides an example of one implementation of the present invention, although other implementations are possible.

The server computer (50) is connected to an interconnected network of computers such as the Internet. Various computer systems may connect to the server computer (50) to obtain services described.

The following describe different implementations of the present invention, which may consist for example of Internet services that may be provided by the server computer (50).

Revising Ranking Preferences

Obtaining a full ranking preference, and then revising this ranking preference based on partial preference information, based on a revision of the probabilities. The revised probabilities have more certainty in the modeling of that individual's full preference, especially as more preference data is revealed by, or obtained about, the same individual. With the revised probabilities, statistical inference tasks may now be performed: this includes making customized product and item recommendations, placing the user in a particular market segment for purposes of advertising or marketing, or adapting survey questions designed for promotional, political and other decision-making purposes.

Collaborative Filtering Services

Providing collaborative filtering services. Prior art in collaborative filtering may involve a setting where users' numerical preference ratings are given. A collaborative filtering service based on present invention requires only pairwise comparisons. This may be less restrictive than the prior art, since numerical ratings of items can be converted to pairwise preference comparisons over items, however, pairwise preferences cannot be converted to numerical ratings without positing strong assumptions regarding strength of preference. In other words, numerical preferences may implicitly require strength of preference such as "I like A twice as much as B" while choice data may only rely on qualitative and inherently relative preference data. Therefore, the present invention may provide benefits over the prior art in that it may require fewer assumptions about the form of the observed, surveyed or otherwise revealed preferences of users. The present invention may also impose less cognitive burden on users who are asked to explicitly to specify information about their preferences. At the same time, the present invention may produce models that are better aligned to the actual observed evidence from choice settings (including web search and voting applications).

Objective Ranking

The present invention may also provide a benefit over the prior art with respect to computing an objective ranking. This may be as simple as assuming there is only one component in the Mallows mixture model and that user preferences are noisy deviations from the central, objective ranking.

The present invention may further provide benefits over the prior art with respect to learning Mallows models. The present invention may allow learning and inference with arbitrary choice data, which may be building blocks of a wide range of practical preference structures, and may be much broader than the restrictive preferences used in the prior art.

The utility of learning probabilistic models of user preferences may be significant. Such models may be used, and may be necessary, for a variety of purposes. Some of these uses may include:

Product Selection/Design:

A vendor choosing which product or products to offer its target market may want to select those with the greatest potential for sales. Optimal choice of a product (either explicitly designed, or selected from a set of options made available by suppliers) may depend on the distribution of preferences of members of its target market/population. A probabilistic model of consumer preferences may be a necessary input to any sound method or algorithm (or other calculation) for optimal selection of product offerings. Different products may be selected or designed for sales/marketing to each sub-group. A possible example may be displaying a slate of new release movies on a movie rental website such that there is at least one movie from the slate which appeals to any given subgroup.

Market Segmentation:

A model of population preferences may also be used to optimally segment the target market into sub-groups where members of a sub-group have similar preferences, but members of distinct subgroups have much more divergent preferences.

Consumer Preference Identification:

The observed behavior or revealed preferences of a specific consumer (e.g., through a survey) may often be minimal. For instance, information about a consumer may consist of a small number of choices (perhaps even a single choice) of a product from a set of alternatives (e.g., the consumer chose to buy book X when presented with a set of options which included X). Using probabilistic inference techniques, this single piece of information may be used to probabilistically estimate that consumer's preferences for a variety of other products by conditioning on the observed choice. Specifically, by using the population preference model combined with the observed choice, it may be possible to provide a much more precise specification of that consumer's preferences than is offered by the population model alone. This form of inference may be used to place the consumer in a particular market segment (see above) with more precision and greater confidence, and may form the basis of tailored marketing strategies, personalized product recommendation, etc. This form of inference may also be used to support the dynamic aggregation of individuals based on their inferred preferences for the purposes of demand-driven group discounting. When (sub) groups of individuals with similar preferences are automatically identified and targeted in this way, more customization of offers to sub-groups may take place, leading to greater yield (acceptance of offers) with less intrusion (fewer unwelcome offers).

Survey, Active Learning and Preference Elicitation Methods:

Application services may be designed to make recommendations (e.g., products, services, or information sources) after asking a user a number of queries related to their preferences. A model of population preferences can be used directly to optimize the query selection strategy in an adaptive fashion so as to minimize the expected (average) number of queries a user must face to determine good or optimal recommendations. This may lead to less cognitive burden on the part of users and hence more satisfaction with a recommendation system that incorporates or links to the inference engine of the present invention. Such technology may also be applied to group decision making, where preferences of group members may be diverse and a consensus choice must be made. In this case preference queries should be carefully chosen so as to ask the right individual the right preference query, in such a way as to recommend the best consensus choice requiring minimal interaction with users. In such applications the technology used to generate intelligent queries may exploit the structure in the preference distribution of individuals, so that only relevant queries are asked. For example, if the input preference distribution indicates that a particular choice is generally dis-preferred, intelligent queries do not need to focus on that choice and instead focus elicitation efforts on more popular choices. The present invention may include the generalized repeated insertion model (GRIM), a method for sampling from arbitrary ranking distributions including conditional Mallows that generalizes the repeated insertion method for unconditional sampling of Mallows models (Doignon et al., 2004).

For example, the present invention may utilize such a sampler as the core of a Monte Carlo EM algorithm to learn Mallows mixtures, as well as to evaluate log likelihood. It may be possible to extend the non-parametric framework of Lebanon & Mao (2008) to handle unrestricted ordinal preference data. Experiments have shown that the algorithms and other calculations of the present invention may effectively learn Mallows mixtures, with very reasonable running time, on datasets (e.g., Movielens) with hundreds of items and thousands of users.

Targeted Advertising:

The present invention may be used for targeted advertising purposes. Using preference data (of a very general kind: i.e. a set of pairwise comparisons) of users obtained from their browser cookies, account information, etc. The present invention is operable to a statistical model that reveals the clustering structure of the users wherein in each cluster (i.e. group) of users their preferences are similar to one another. This allows advertisers and marketers to tailor their messages to the interests of groups of similar users. Furthermore, the groups of similar users reveal preference patterns that help businesses to design their products in order to target different user groups. The system of the present invention may be operable for example to generate in real time or near real time clusters of users and associated inferred preferences, in support of for example an ad network.

Crowdsourcing:

Crowdsourcing applications are applied in a variety of context including for gathering information, opinion, judgments from users, including to arrive at a more accurate answer or decision. One prominent use case involves inferring the correct option (or choice, or object, etc.) (or a ranking of such options) from a multitude of options. For example, consider a website that wants to categorize restaurants, for a given restaurant it can present users with a pair of categories such as "Korean" and "Japanese" and have the user choose the more appropriate categorization (e.g. Korean), this allows the website to collect, for each user, a set of pairwise comparisons about the most plausible categorization of a particular restaurant. To aggregate such pairwise comparisons from users and present a ranked list in order of plausible categorization, our algorithms can be used to make such an inference.

Representative Implementations of Operations

A skilled reader will recognize the variety of implementations of the present invention are possible. What follows is a detailed explanation of algorithms for enabling the implementation of the operations described above. A variety of Definitions and Theorems may be applied to the embodiments of the present invention. The Definitions and Theorems discussed herein are merely representations of examples of possible Definitions and Theorems to be applied by embodiments of the present invention.

Preliminaries

It may be assumed that there is a set of items $A=\{a_1, \ldots, a_m\}$ and n agents, or users, $N=\{1, \ldots, n\}$. Each agent l may have preferences over the set of items represented by a total ordering or ranking $\prec_l$ over A. It may be possible to write $x \prec l\ y$ to mean l prefers x to y. Rankings may be represented as permutations of A. For any positive integer b, let $[b]=\{1, \ldots, b\}$. A bijection $\delta: A \to [m]$ represents a ranking by mapping each item into its rank. Thus, for $i \in [m]$, $\sigma^{-1}(i)$ is the item with rank i. It may be possible to write $\sigma=\sigma_1\sigma_2 \ldots \sigma_m$ to indicate a ranking with i-th ranked item $\sigma_i$ and $\prec_\sigma$ for the induced preference relation. For any $X \subseteq A$, let $\sigma|_x$ denotes the restriction of $\sigma$ to items in X. And $1[.]$ is the indicator function.

Generally, access to the complete preferences of agents may not be possible, but only partial information about their rankings may be possible (e.g., based on choice behaviour, query responses, etc.). It may be assumed that this data has a very general form: for each agent l there may be a set of revealed pairwise preference comparisons over A, or simply preferences: $\{v_l = \prec y_1^l, \ldots, x_{kl}^l \prec ly_k^l\}$. It is possible to write $tc(v_l)$ to denote the transitive closure of $v_l$. Since preferences may be strict, $tc(v_l)$ may be a strict partial order on A. It may be assumed that each $tc(v_l)$ may be consistent, in which case $tc(v_l)$ will contain no cycles. (It may be possible to apply concepts of the present invention to models where revealed preferences are noisy.) Preferences $v_l$ may be complete if $tc(v_l)$ is a total order on A. It may be possible to write $\Omega(v)$ to denote the linear extensions of v, i.e., the set of rankings consistent with v; it may be possible to write $\Omega$ to denote $\Omega=\Omega(\emptyset)$. $\Omega$ is the set of all m! complete preferences. A collection $V=(v_1, \ldots, v_n)$ is a (partial) preference profile: this may comprise observed data of the present invention.

Given $\sigma=\sigma_1\sigma_2 \ldots \sigma_m$ and preference v, it may be possible to define:

$$d(v, \sigma) = \sum_{i<j} 1[\sigma_j \succ \sigma_i \in tc(r)]. \qquad (1)$$

This measures dissimilarity between a preference set and a ranking using a number of pairwise disagreements (i.e., those pairs in v that are misordered relative to $\sigma$). If v is a complete ranking $\sigma^1$, then $d(\sigma^1, \sigma)$ is the classic Kendall-tau metric on rankings.

Arbitrary sets v of paired comparisons model a wide range of realistic revealed preferences. Full rankings (Murphy & Martin, 2003) may require m−1 paired comparisons $(a \prec b \prec c \ldots)$: top-t preferences (Busse et al., 2007) may need m−1 pairs (t−1 pairs to order the top t items, m−t pairs to set the tth item above the remaining m−t): rankings of subsets $X \subseteq A$ (Guiver & Snelson, 2009; Cheng et al., 2010) may be also representable. It may also be possible to consider the following rich class:

Definition 1 (Lebanon & Mao 2008). A preference set v is a partitioned preference if A can be partitioned into subsets $A_1, \ldots, A_q$ s.t.: (a) for all $i<j \leq q$, if $x \in A_i$ and $y \in A_j$ then $x \prec_{tc(v)} y$ and (b) for each $i \leq q$, items in $A_i$ are incomparable under tc v.

Partitioned preferences are general, subsuming the special cases above. However, they may not represent many naturally occurring revealed preferences, including something as simple as a single paired comparison: v={a≺b}.

There are many distributional models of rankings—Marden (1995) provides a good overview. The two most popular in the learning community are the Mallows (1957) model and the Plackett-Luce model (Plackett, 1975: Luce, 1959). The present invention focuses on Mallows models, though embodiments of the present invention may extend to include other models. The Mallows φ model may be parameterized by a modal or reference ranking σ and a dispersion parameter φ∈(0, 1]. It may be possible to let r refer to an arbitrary ranking, then the Mallows model specifies:

$$P(r) = P(r \mid \sigma, \phi) = \frac{1}{Z} \phi^{d(v,\sigma)}, \quad (2)$$

where $Z=\Sigma_r \in \Omega \phi^{d(r',\sigma)}$ The normalization constant may satisfy:

$$Z = 1 \cdot (1+\phi) \cdot (1+\phi+\phi^2) \ldots (1+ \ldots +\phi^{m-1}). \quad (3)$$

When φ=1 it may be possible to obtain the uniform distribution over the space Ω of rankings, and as φ→0 it may be possible to approach the distribution that concentrates all mass on σ. Sometimes the model may be written as $$P(r \mid \sigma, \lambda) = \frac{1}{Z} e^{-\lambda d(r,\sigma)}$$

where $\lambda=-\ln\phi \geq 0$. To overcome the unimodal nature of Mallows models, mixture models have been proposed. A mixture with K components may require reference rankings $\sigma=(\sigma_1, \ldots, \sigma_K)$ dispersion parameters $\phi=(\phi_1, \ldots, \phi_K)$ and mixing coefficients $\pi=(\pi_n, \ldots, \pi_K)$. EM methods for such mixtures (limited to complete or top-k data) have been studied (Murphy & Martin, 2003: Russe et al., 2007).

The repeated insertion model (RIM), introduced by Doignon et al. (2004), is a generative process that gives rise to a family of distributions over rankings and provides a practical way to sample rankings from a Mallows model. Assume a reference ranking $\sigma=\sigma_1\sigma_2, \ldots \sigma_m$ and insertion probabilities $p_{ij}$ for each i≤m, j≤i. RIM generates a new output ranking using the following process, proceeding in m steps. At Step 1, $\sigma_1$ is added to the output ranking. At Step 2, $\sigma_2$ is inserted above $\sigma_1$ with probability $p_{2,1}$ and inserted below with probability $p_{2,2}=1-p_{2,1}$. More generally, at the ith step, the output ranking will be an ordering of and $\sigma_1, \ldots, \sigma_{i-1}$ and $\sigma_1$ will be inserted at rank j≤i with probability $p_{ij}$. Critically, the insertion probabilities are independent of the ordering of the previously inserted items.

It may be possible to sample from a Mallows distribution using RIM with appropriate insertion probabilities.

Definition 2. Let $\sigma=\sigma_1 \ldots \sigma_m$ be a reference ranking. Let $I=\{(j_1, \ldots, j_m) | j_i \leq i, \forall i \leq m\}$ be the set of insertion vectors. A repeated insertion function $\Phi_\sigma: I \rightarrow \Omega$ maps an insertion vector $(j_i, \ldots, j_m)$ into a ranking $\phi_\sigma(j_1 \ldots j_m)$ by placing each $\sigma_i$, in turn, into rank $j_i$, for all i≤m.

The definition may be best illustrated with an example. As an example, consider insertion vector (1,1,2,3) and σ=abcd. Then $\Phi_\sigma(1. 1. 2. 3)$=bcda because: a may be first inserted into rank 1: and b may then be inserted into rank 1, shifting a down to get partial ranking ba; c may then be inserted into rank 2, leaving b but moving a down, giving bca: finally, d may be inserted at rank 3, giving bcda. Given reference ranking σ, there is a one-to-one correspondence between rankings and insertion vectors. Hence, sampling by RIM may be described as: draw an insertion vector $(j_1, \ldots, j_m) \in I$ at random, where each $j_i \leq i$ is drawn independently with probability $p_{ij_i}$—note that $\sigma_{j=1}^i p_{ij_i}=1$ for all i- and return ranking $\Phi_\alpha(j_1 \ldots j_m)$.

Theorem 3 (Doignon et al. 2004). By setting $p_{ij_i}=\Phi^{i-j}/(1+\phi+\ldots+\phi^{i-1})$ for j≤i≤m, RIM induces the same distribution over rankings as the Mallows model.

Thus RIM may offer a simple, useful way to sample rankings from the Mallows distribution. (RIM may also be used to sample from variants of the, Mallows model, e.g., those using weighted Kendall-tau distance.)

Generalized Repeated Insertion

While RIM may provide a powerful tool for sampling from Mallows models (and by extension, Mallows mixtures), it samples unconditionally, without (direct) conditioning on evidence. The present invention may generalize RIM by permitting conditioning at each insertion step. The present invention may utilize the generalized repeated insertion model (GRIM) to sample from arbitrary rank distributions.

Sampling from Arbitrary Distributions

Rather than focus on conditional Mallows distribution given evidence about agent preferences, the present invention may apply GRIM abstractly as a means of sampling from any distribution over rankings. The chain rule allows the present invention to represent any distribution over rankings in a concise way, as long as dependencies in the insertion probabilities are admitted: specifically, the insertion probabilities for any item $\sigma_1$ in the reference ranking may be conditioned on the ordering of the previously inserted items $\sigma_1, \ldots, \sigma_{i-1}$.

Let Q denote distribution over rankings and σ an (arbitrary) reference ranking. It may be possible to (uniquely) represent any ranking r∈Ω using σ and an insertion vector $J^r=(j_1^r, \ldots, j_m^r)$ where $r=\phi_\sigma(j^r)$. Thus Q may be represented by a distribution Q' over I: Q'($j_r$)=Q(r). Similarly, for k<m, any partial ranking $r[k]=(r_1, \ldots, r_k)$ of the items $\{\sigma_1, \ldots, \sigma_k\}$, may be represented by a partial insertion vector $j[k]=(j_1^r, \ldots, j_k^r)$. Letting $Q(r[k])=\Sigma\{Q(r): r_1 \prec r_2 \prec \ldots \prec r_k\}$, and $Q'(j[k])=\Sigma\{Q'(j'):j'[k]=j[k]\}$, results in Q'(j[k])=Q(r[k]). Conditional insertion, probabilities may be defined as:

$$P_{ij} | j[i-1] = Q'(j_i=j|j[i-1]) \quad (4)$$

This denotes the probability with which the ith item $\sigma_1$ in the reference ranking may be inserted at position j≤i, conditioned on the specific insertions $(r_1, \ldots, r_{i-1})$ of all previous items. By the chain rule, it may be possible to define:

$$Q'(j)=Q'(j_m|j[m-1])Q'(j_{m-1}|j[m-2]) \ldots Q'(j[1]).$$

If RIM is run in the present invention with the conditional insertion probabilities $p_{ij|j[i-1]}$ defined above, it draws random insertion vectors j by sampling $j_1$ through $j_m$ in turn, but each conditioned on the previously sampled components. The chain rule ensures that the resulting insertion vector is sampled from the distribution Q'. Hence the induced distribution over rankings $r=_{\phi o}(j)$ is Q. This procedure is referred to as the generalized repeated insertion model (GRIM).

Theorem 4. Let Q be a ranking distribution and σ a reference ranking. For any r∈Ω, with insertion vector $j^r$ (i.e., $r=\Phi_\sigma(j^r)$), GRIM, using the insertion probabilities in Eq. 4, generates insertion vector $j^r$ with probability $Q'(j^r)=Q(r)$.

Figure 3:
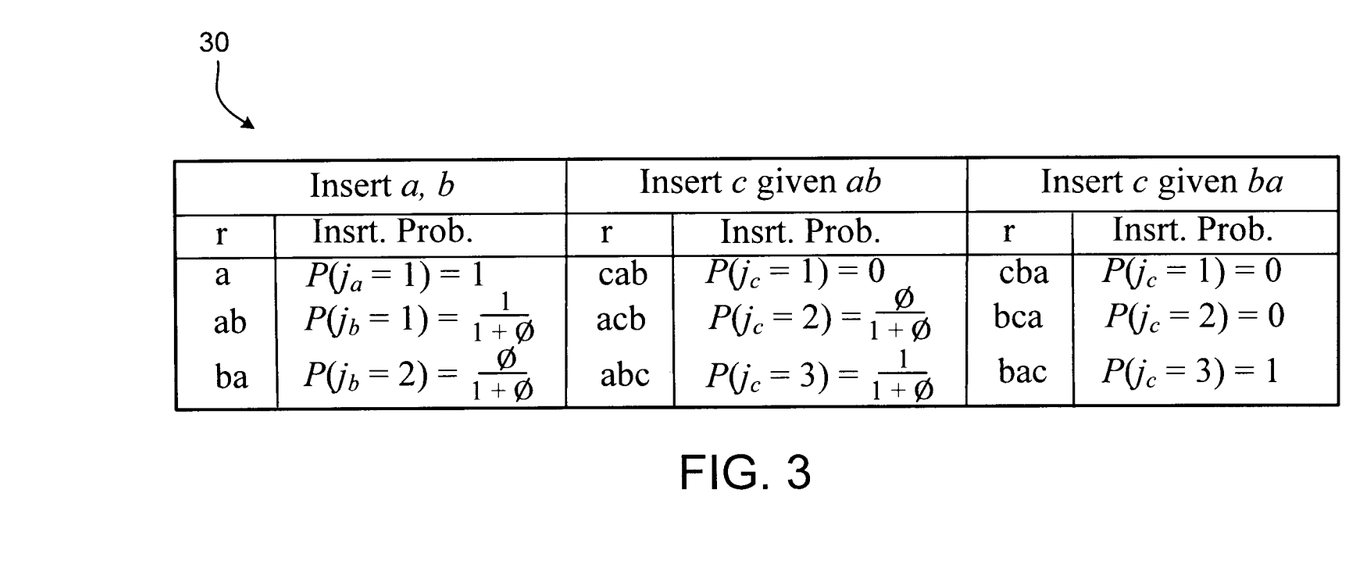
FIG. 3 shows an example of ranking distributions, in accordance with GRIM in a tabular format.

As shown in FIG. 3, it may be possible to illustrate GRIM using a simple example. In particular, FIG. 3 shows an example of trace or run of the GRIM algorithm and the probability of any ranking that it may produce at each step of the process in a tabular format. The table 30 shows a sampling from a (conditional Mallows model on A={a, b, c}, with dispersion φ, given evidence v={a≺c}. The resulting ranking distribution Q may be given by the product of the conditional insertion probabilities:

$$Q(abc) = \frac{1^2}{1+\Phi};$$

$$Q(abc) = \frac{\Phi^2}{1+\Phi};$$

and $$Q(bac) = \phi/(1+\phi).$$

As required, Q(r)=0 iff r is inconsistent with evidence v.

Sampling a Mallows Posterior

While GRIM may allow sampling from arbitrary distributions over rankings, as presented above it may be viewed as largely a theoretical device, since it requires inference to compute the required conditional probabilities. To sample from a Mallows posterior, given arbitrary pairwise comparisons v, the present invention may compute the required terms in a tractable fashion. The Mallows posterior may be given by:

$$P_v(r) = P(r \mid v) = \frac{\phi^{d(r,\sigma)}}{\sum_{r' \in \Omega(v)} \phi^{d(r',\sigma)}} 1[r \in \Omega(v)] \quad (5)$$

which may require summing over an intractable number of rankings to compute the normalization constant.

One embodiment of the present invention may use RIM for rejection sampling: sample unconditional insertion ranks, and reject a ranking at any stage if it is inconsistent with v. However, this may be impractical because of the high probability of rejection. Instead it may be possible to use GRIM. The main obstacle is computing the insertion probability of a specific item given the insertion positions of previous items in Eq. 4 when Q' (more precisely, the corresponding Q) may be the Mallows Posterior. Indeed, this is #P-hard even with a uniform distribution over Ω(v).

Proposition 5. Given v, a reference ordering σ, a partial ranking $r_1 \ldots r_{i-1}$ over $\{\sigma_1 \ldots \sigma_{i-1}\}$ and $j \in \{1 \ldots i\}$, computing the probability of inserting $\sigma_1$ at rank j w.r.t. the uniform Mallows posterior P (i.e., computing P(r)×1[r∈Ω(r)]) is #P-hard.

This suggests it may be hard to sample exactly, and that computing the normalization constant in a Mallows posterior may be difficult. Nevertheless the present invention may include an approximate sampler AMP that is efficient to compute. While it can perform poorly in the worst-case, it may be possible that, empirically, it may produce posterior approximations. (It may be possible to provide theoretical bounds on approximation quality.)

Figure 1:
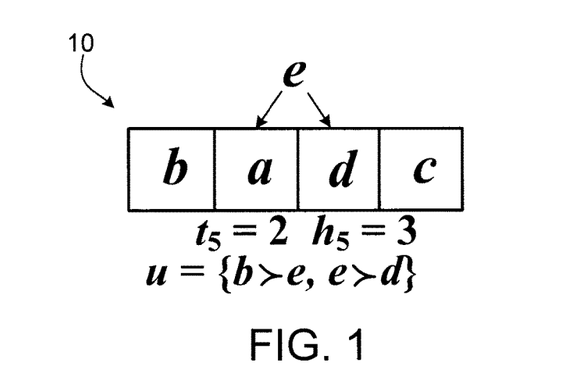
FIG. 1 shows an example of valid insertion ranks for item "e" given previously inserted items and constraints.

AMP may use the same intuitions as illustrated in Example 1, where the (unconditional) insertion probabilities may be used by RIM, but subject to constraints imposed by v. At each step, the item being inserted may only be placed in positions that do not contradict tc(v). It may be possible to show that the valid insertion positions for any item, given v, form a contiguous "region" of the ranking (as shown in FIG. 1, wherein valid insertion ranks for item e 10 may be $(l_5, \ldots, h_5) = \{2,3\}$ given previously inserted items and constraints v).

Proposition 6. Let insertion of $\sigma_1 \ldots \sigma_{i-1}$ give a ranking $r_1 \ldots r_{i-1}$ consistent with tc(v). Let $L_i = \{i' \leq i \mid r_{i'} \prec tc(v)\sigma i\}$ and $H_i = \{i' \leq i \mid r_{i'} \prec tc(v)\sigma_i\}$. Then inserting $\sigma_i$ at rank j is consistent with tc(v) area iff $j \in \{l_i \cdot l_i+1, \ldots, h_i \cdot 1 \cdot h_i\}$ where $$L = \begin{cases} 1 & \text{if } L_i = \emptyset \\ \text{argmax} L_i + 1 & \text{otherwise} \end{cases} \quad (6)$$

$$b_i = \begin{cases} i & \text{if } H_i = \emptyset \\ \text{argmin} H_i & \text{otherwise} \end{cases} \quad (7)$$

Prop. 6 may immediately suggest a modification of the GRIM algorithm, AMP, for approximate sampling of the Mallows posterior: First initialize ranking r with $\sigma_1$ at rank 1. Then for i=2 . . . m, compute $l_i$, $h_i$, and insert $\sigma_i$, at rank $j \in \{l_i \ldots h_i\}$ with probability proportional $\phi^{i-j}$.

AMP may induce a sampling distribution $\hat{P}_v$ that does not match the posterior $P_v$, exactly: indeed the KL-divergence between the two may be severe, as the following example shows. Let A={$a_1 \ldots a_m$} and r=$a_2 \prec a_3 \prec \ldots \prec a_m$. Let P the uniform Mallows prior (φ=1) with σ=$a_1 \ldots a_m$. There are m rankings in Ω(r) one $r_i$ for each placement of $a_1$. The true Mallows posterior $P_v$ may be uniform over Ω(r). But AMP may induce an approximation with $\hat{P}_v(r_i)=2^{-i}$ for i≤m−1 and $\hat{P}_v(r_m)=2^{-m-1}$ The KL-divergence of $P_v$ and $\hat{P}_v$ is $$m - 1/2 + (1 - 2/m)\log_2 m - (1 + 1/m).$$

While AMP may perform poorly in the worst-case, it may do well in practice. It may be possible to prove interesting properties, and provide theoretical guarantees of exact sampling in important special cases. First, AMP may always produce a ranking (insertion positions may always exist given any consistent v). Furthermore:

Proposition 7. The support of distribution $\hat{P}_v$, induced by AMP is Ω(v) (i.e., that of the Mallows posterior, Eq. 5).

Proposition 8. For any r∈Ω(v), AMP outputs r with probability:

$$\hat{P}_V(r) = \frac{\phi^{d(r,\sigma)}}{\prod_{i=1}^{m}(\phi^{i-h_i} + \phi^{i-h_i+1} + \ldots + \phi^{i-1_i})}. \quad (8)$$

Using this result it may be possible to show that if v lies in the class of partitioned preferences, AMP's induced distribution may be exactly the Mallows posterior:

Proposition 9. If v is partitioned, the distribution $P_v$ induced by AMP is the Mallows posterior $P_v$.

While AMP may have (theoretically) poor worst-case performance, it may be possible to develop a statistically sound sampler MMP by using AMP to propose new rankings for the Metropolis algorithm. With Eq. 8, it may be possible to derive the acceptance ratio for Metropolis. At step t+1 of Metropolis, let $r^{(t)}$ be the previous sampled ranking. Ranking r, proposed by AMP independently of $r^{(t)}$, may be accepted as $r^{(t+1)}$ with probability $$\min\left(1, \prod_{i=1}^{m}\left\{\begin{array}{ll} \dfrac{h_i - l_i + 1}{h_i^t - l_i^t + 1} & \text{if } \phi = 1 \\ \dfrac{\phi^{h_i^t - h_i}(1 - \phi^{h_i - l_i + 1})}{1 - \phi^{h_i^t - l_i^t + 1}} & \text{otherwise} \end{array}\right\}\right) \quad (9)$$

where the $l_i$'s and $h_i$'s are as in Eq. 6 and 7, respectively (defined w.r.t. r; and $l_i^t$ and $h_i^t$ are defined similarly, but w.r.t $r^{(t)}$. Prop. 7 may help show:

Theorem 10. The Markov chain as defined in MMP is ergodic on the class of states $\Omega(r)$.

Sampling a Mallows Mixture Posterior

Extending the GRIM, AMP and MMP algorithms to sampling from a mixture of Mallows models may be straightforward. The prior art includes relatively little work on probabilistic models of partial rankings, and the prior art contains no known proposed generative models for arbitrary sets of consistent paired comparisons. One embodiment of the present invention may include such a model while other embodiments may extend algorithms and calculations to sample from a mixture of Mallows models.

It may be assumed that each agent has a latent preference ranking r, drawn from a Mallows mixture with parameters $\pi=(\pi_1 \ldots \pi_K)$, $\sigma=(\sigma_1 \ldots \sigma_K)$ and $\phi=(\phi_1 \ldots \phi_K)$. Embodiments of the present invention may use a component indicator vector $z=z_1 \ldots z_K) \in \{0,1\}^K$, drawn from a multinomial with proportions $\pi$, which specifies the mixture component from which an agent's ranking is drawn: if $z_k=1$, r is sampled from the Mallows model with parameters $\sigma_k, \phi_k$. The observed data of the present invention may be a preference profile $V=(v_1 \ldots v_n)$. It may be possible to let $Z=(z_1 \ldots z_n)$ Denote the Latent Indicators for Each Agent. To Generate l's preferences $v_l$, it may be possible to use a simple distribution, parameterized by $\alpha \in [0, 1]$, that reflects a missing completely at random assumption. (This may not be realistic in all settings, but may serve as a useful starting point for some embodiments of the present invention.)

It may be possible to define $P(v|r,\alpha)=\alpha^{|v|}(1-\alpha)^{\binom{m}{2}-|v|}$ if $r \in \Omega(v)$; and $P(v|r,\alpha)=0$ otherwise. It may be possible to view this as a process in which an a-coin is flipped for each pair of items to decide whether that pairwise comparison in r is revealed by v. Taken together, the outcome is the joint distribution:

$$P(v,r,z|\pi,\sigma,\phi,\alpha)=P(v|r,\alpha)P(r|z,\sigma,\phi)P(z|\pi).$$

In embodiments of the present invention it may be possible to sample from the mixture posterior, $P(r, z|v, \pi, \sigma, \phi) \propto P(v|r, \alpha)P(r|z, \sigma, \phi)P(z|\pi)$. Such embodiments may utilize Gibbs sampling to alternate between r and z, since the posterior does not factor in a way that permits us to draw samples exactly by sampling one variable, then conditionally sampling another. It may be possible to initialize with some $z^{(0)}$ and $r^{(0)}$, then repeatedly sample the conditionals of z given r and r given z. For the t-th sample, $z^{(t)}$ may be drawn from a multinomial with K outcomes: $P(z:z_k=1|r^{(t-1)}) \propto \phi_k^{d(r^{(t-1)},\sigma_k)} \pi_k$. It may be possible to then sample $r^{(t)}$ given $z^{(t)}$, $\Pr[z^{(t)}, r) \propto P(v|r)P(r|z^{(t)})P(z^{(t)}) \propto \phi_k^{d(r,\sigma_k)} 1[r \in \Omega(v)]$ if $z_k^{(t)}=1$. This form of Mallows posterior sampling may be applied by embodiments of the present invention with AMP or MMP.

EM for Learning Mallows Mixtures

Armed with the sampling algorithms derived froth GRIM, the present invention may implement maximum likelihood learning of the parameters $\pi$, $\sigma$, and $\phi$ of a Mallows mixture using EM. Before implementing an EM algorithm or calculation, it may be necessary to consider the evaluation of log likelihood, which is used to select K or test convergence.

Evaluating Log Likelihood: Log likelihood $\mathcal{L}_\alpha(\pi, \sigma, \phi|V)$ in models applied by the present invention may be written as:

$$\sum_{l \in N} \ln\left[\sum_{k=1}^{K} \sum_{r_l \in \Omega(v_l)} \frac{\pi_k \phi_k^{d(r_l, \sigma_k)}}{Z_k}\right] + \ln \alpha^{|v_l|}(1-\alpha)^{\binom{m}{2}-|v_l|},$$

where $Z_k$ is the Mallows normalization constant. It may be easy to derive the maximum likelihood estimate for $$\alpha: \alpha^* = \sum_{l \in n} \frac{2|v_l|}{(nm(m-1))}.$$

So it may be possible to ignore this additive constant, and focus on the first term in the sum, denoted $\mathcal{L}(\pi, \sigma, \phi|V)$. Unfortunately, evaluating this theorem may be provably hard:

Theorem 11. Given profile $V=(v_1 \ldots r_n)$, computing the log likelihood $\mathcal{L}(\pi, \sigma, \phi|V)$ is #P-hard.

As a result, it may be possible for embodiments of the present invention to consider approximations. It is possible to rewrite $\mathcal{L}(\pi, \sigma, \phi|V)$ as $$\sum_{l \in n} \ln\left[\sum_{k=1}^{K} \pi_k \mathbb{E}_{p(r|\sigma_k, \phi_k)} 1[r \in \Omega(v)]\right].$$

and estimate the inner expectations by sampling from the Mallows model $P(r|\sigma_k, \phi_k)$. However, this can require exponential sample complexity in the worst case (e.g., if K=1 and v is far from $\sigma$, i.e. $d(v, \sigma)$ is large, then a sample of exponential size may be expected to ensure v is in the sample). But it is possible to rewrite the summation inside the log as:

$$\sum_{l \in n} \ln\left[\sum_{k=1}^{K} \frac{\pi_k}{Z_k} \sum_{r \in \Omega(v_l)} \phi_k^{d(r, \sigma_k)}\right].$$

and evaluate $\Sigma r \in \Omega(v_l) \phi_k^{d(r,\sigma_k)}$ via importance sampling. It may be possible to generate samples using AMP, then empirically approximate:

$$\sum_{r \in \Omega(v_l)} \phi_k^{d(r, \sigma_k)} = \mathop{\mathbb{E}}_{r \sim \hat{P}_{v_l}}\left[\frac{\phi_k^{d(r, \sigma_k)}}{\hat{P}_{v_l}(r | \sigma_k, \phi_k)}\right]. \quad (10)$$

We generate samples $r_{lk}^{(1)} \ldots r_{lk}^{(T)}$ with AMP($v_l, \sigma_k, \phi_k$) for $l \leq n$ and $k \leq K$, then substitute $\hat{P}_v$ from Eq. 8 into Eq. 10. With some algebraic manipulation it may be possible to obtain the estimate:

$$\sum_{\ell \in N} \ln \left[ \frac{1}{T} \sum_{k=1}^{K} \sum_{t=1}^{T} \pi_k \left\{ \begin{array}{ll} \frac{1}{m!} \prod_{i=1}^{m} \left( h_i^{(\ell k t)} - l_i^{(\ell k t)} + 1 \right) & \text{if } \phi_k = 1. \\ \phi_k^{\sum_{i=1}^{m} i - h_i^{(\ell k t)}} \prod_{i=1}^{m} \frac{1 - \phi_k^{h_i^{(\ell k t)} - l_i^{(\ell k t)} + 1}}{1 - \phi_k^i} & \text{otherwise.} \end{array} \right. \right]$$

where, $h_i^{(lkt)}$ and $l_i^{(lkt)}$ are defined in Equs. 6 and 7 (defined w.r.t. $r_{lk}^{(t)}$, $\sigma_k$, $v_l$).

EM for Mallows Mixtures: Learning a Mallows mixture may be challenging, since even evaluating log likelihood is #P-hard. Embodiments of the present invention may exploit posterior sampling methods to render EM tractable. The EM approach of Neal & Hinton (1999) may be applied in embodiments of the present invention as follows (recall the invention may not need to consider $\alpha$): The present invention may initialize it parameters with values $\pi^{old}$, $\sigma^{old}$, and $\phi^{old}$. For the E-step, instead of working directly with the intractable posterior $P(z_l, r_l | v_l \cdot \pi^{old}, \sigma^{old}, \phi^{old})$ the present invention may use GRIM-based Gibbs sampling (as described herein), to obtain samples $(z_l^{(t)}, r_l^{(t)})_{t=1}^{T}$, $l \in N$. In the M-step, it may be possible to find a (local) maximum, $\pi^{new}$, $\sigma^{new}$, $\phi^{new}$, of the empirical expectation:

$$\operatorname*{argmax}_{\pi,\sigma,\phi} \sum_{l \in N} \frac{1}{T} \sum_{t=1}^{T} \ln P(v_l, r_l^{(t)}, z_l^{(t)} | \pi, \sigma, \phi).$$

if each parameter is fully maximized by the present invention in the order $\pi$, $\sigma$, $\phi$ it may be possible to obtain a global maximum.

Of course, exact optimization may be intractable, so the present invention may approximate the components of the M-step. Abusing notation, let indicator vector $z_l^{(t)}$ denote the mixture component to which the t-th sample of l belongs. The present invention may partition all agents' samples into such classes: let $S_k = (\rho_{k1} \ldots \rho_{kj_k})$ be the sub-sample of rankings $r_l^{(t)}$ that belong in the k-th component, i.e., where $z_l^{(t)} = k$. Note that $j_1 + \ldots + j_K = nT$. It may be possible to rewrite the M-step objective as:

$$\frac{1}{T} \sum_{k=1}^{K} \sum_{i=1}^{j_k} \ln P(v_{l(k,i)} | \rho_{ki}) P(\rho_{ki} | \sigma_k, \phi_k) P(k | \pi_k),$$

where $l(k, i)$ is the agent for sample $\rho_{k,i}$. Embodiments of the present invention may ignore $P(v_{l(k,i)} | \rho_{ki})$, which may only impact $\alpha$ :and it may be possible to know $\rho_{ki} \in \Omega(v_{l(k,i)})$. Thus, it may be possible to rewrite the objective as:

$$\sum_{k=1}^{K} \sum_{i=1}^{j_k} \ln \pi_k + d(\rho_{ki}, \sigma_k) \ln \phi_k - \sum_{w=1}^{m} \ln \frac{1 - \phi_k^w}{1 - \phi_k}. \quad (12)$$

Optimizing $\pi$: Embodiments of the present invention may apply Lagrange multipliers yields:

$$\pi_k = \frac{j_k}{(nT)}, \forall k \leq K. \quad (13)$$

Optimizing $\sigma$: Embodiments of the present invention may apply the term involving $\sigma$ in Eq. 12 which is $$\sum_{k=1}^{K} \sum_{i=1}^{j_k} d(\rho_{ki}, \sigma_k) \ln \phi_k.$$

Since $\ln \phi_k$ is a negative scaling factor, and it may not be possible to optimize the $\sigma_k$ independently, it may be possible to obtain:

$$\sigma_k^* = \operatorname*{argmin}_{\sigma_k} \sum_{i=1}^{j_k} d(\rho_{ki}, \sigma_k). \quad (14)$$

Optimizing $\alpha_k$ may require computing "Kemeny consensus" of the rankings in $S_k$, an NP-hard problem. Drawing on the notion of local Kemenization (Dwork et al., 2001), the present invention may instead compute a locally optimal $\sigma_k$, where swapping two adjacent items in $\sigma_k$ may not be operable to reduce the sum of distances in the Kemeny objective.

Optimizing $\phi$. Some embodiments of the present invention may optimize $\phi$ in Eq. 12. The objective decomposes into a sum that may permit independent optimization of each $\phi_k$. Exact optimization of $\phi_k$ may be difficult: however, the present invention may use gradient ascent with $$\frac{\partial (\text{Eq. 12})}{\partial \phi_k} = \frac{d(S_k, \sigma_k)}{\phi_k} - j_k \sum_{i=1}^{m} \frac{[(i-1)\phi_k - 1]\phi_k^{i-1} + 1}{(1 - \phi_k^i)(1 - \phi_k)}.$$

where $$d(S_k, \sigma_k) = \sum_{i=1}^{m} \frac{[(i-1)\phi_k - 1]\phi_k^{i-1} + 1}{(1 - \phi_k^i)(1 - \phi_k)}$$

Complexity of EM. In an embodiment of the present invention one iteration of the E-step takes $O(nTpT_{Gibbs}(T_{Metro}m^2 + Km \log m))$ time where $T_{Metro}$ is number of Metropolis steps, $T_{Gibbs}$ the number of Gibbs steps, and $T_P$ is the posterior sample size for each $v_l$. The M-step takes time $O(Km^2)$ dominated by the K tournament graphs used to compute Kemeny consensus.

Application to Non-Parametric Estimation: Lebanon & Mao (2008) propose non-parametric estimators for Mallows models when observations form partitioned preferences. Indeed, they offer closed-form solutions by exploiting the existence of a closed-form for Mallows normalization with partitioned preferences. Unfortunately, with general pairwise comparisons, this normalization is intractable unless #P=P. But embodiments of the present invention can use AMP for approximate marginalization to support non-parametric estimation with general preference data. Define a joint distribution over $\Omega(v_l) \times \Omega$ by $$q_l(s, r) = \frac{\phi^{d(r,s)}}{|\Omega(v_l)| Z_\phi},$$

where $Z_\phi$ is the Mallows normalization constant. This corresponds to drawing a ranking s uniformly from $\Omega(v_l)$, then drawing r from a Mallows distribution with reference ranking s and dispersion $\phi$. The present invention may extend the non-parametric estimator to paired comparisons using:

$$p(v) = \frac{1}{n}\sum_{l\in N} q_l(s\in\Omega(v_l), r\in\Omega(v)) = \frac{1}{n}\sum_{l\in N, s\in\Omega(v_l), r\in\Omega(v)} \frac{\phi^{d(r,s)}}{|\Omega(v_l)|Z_\phi}.$$

The present invention may approximate p using importance sampling: choose $\sigma\in\Omega(v_l)$ and sample rankings $s_l^{(1)} \ldots s_l^{(T)}$ from AMP $(v_l, \sigma, \phi=1)$, obtaining:

$$\hat{p}(v) = \frac{1}{nZ_\phi}\sum_{l\in N}\frac{\sum_{t=1}^{T} w_{lt}\sum_{r\in\Omega(v)}\phi^{d(r,s_l^{(t)})}}{\sum_{t=1}^{T} w_{lt}};$$

where $$w_{lt} = 1/\hat{P}_{v_l}(s_l^{(t)})$$

is computed using Eq. 8. Evaluating $$\sum_{r\in\Omega(v)}\phi^{d(r,s_l^{(t)})}$$

may also be intractable, but may be approximated using Eq. 10.

Experiments

Experiments utilizing the present invention have been undertaken to measure the quality of the AMP algorithm both in isolation and in the context of log likelihood evaluation and EM.

Sampling Quality: Experiments utilizing the present invention assessed how well AMP approximates the true Mallows posterior $P_v$. The present invention may vary parameters m, $\phi$ and $\alpha$, and fix a canonical reference ranking $\sigma=(1, 2, \ldots m)$. For each parameter setting, the experiment of the present invention generated 20 preferences v using the mixture model, and evaluated the KL-divergence of $\hat{P}_v$ and $P_v$ (normalized by the entropy of $P_v$). In summary, the experimental results show that AMP can approximate the posterior well, with average normalized KL error ranging from 1-5%, across the parameter ranges tested.

Log Likelihood and EM on Synthetic Data: In summary, the experimentation sampling methods provided excellent approximations of the log likelihood, and EM successfully reconstructed artificially generated mixtures, using pairwise preferences as data.

Figure 2A:
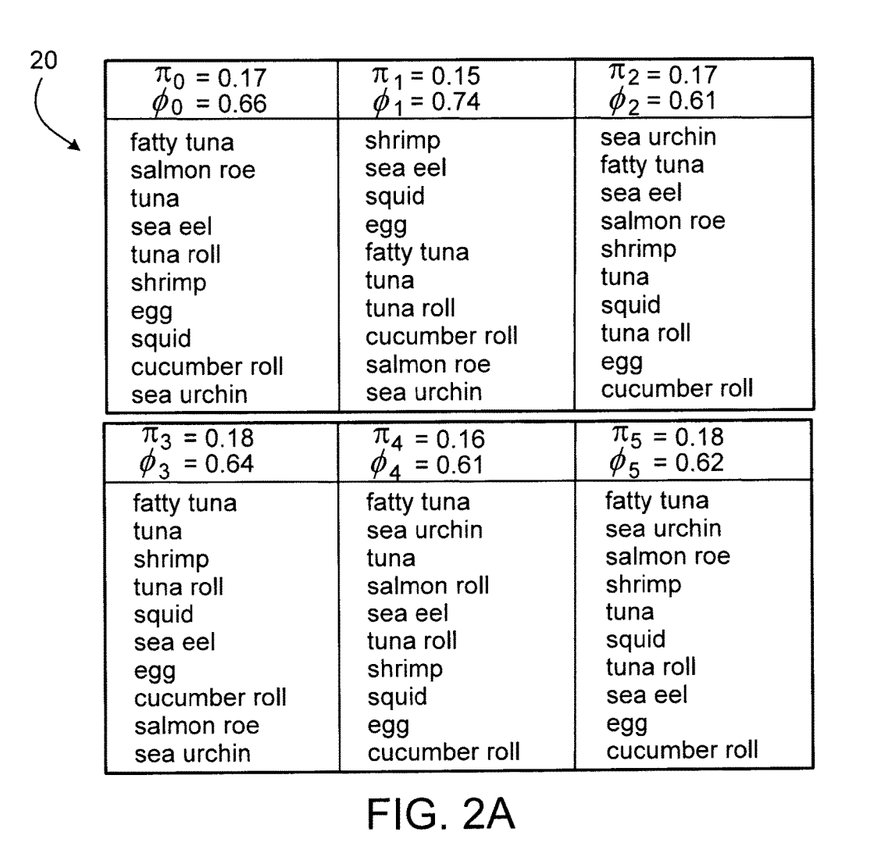
FIG. 2a is a table showing the learned clusters for sushi data.
Figure 2B:
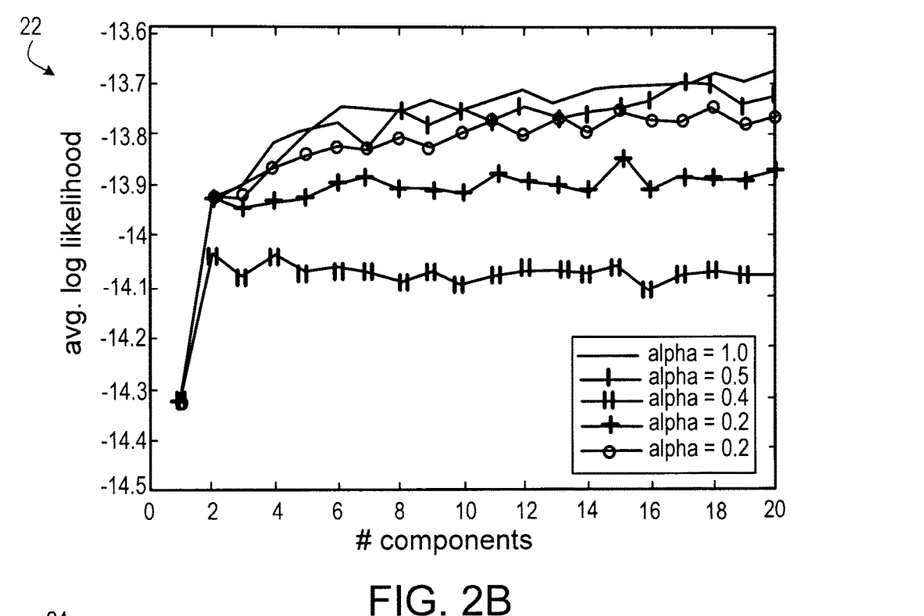
FIG. 2b shows a plot of the sushi average validation log likelihoods on various learned models.
Figure 2C:
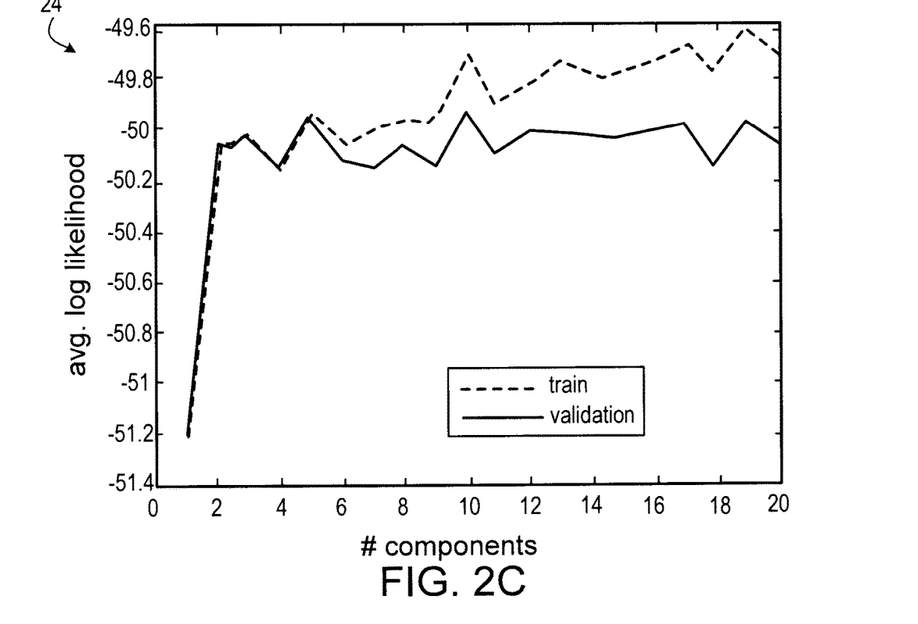
FIG. 2c shows a plot of the Movielens log likelihoods on various learned models.

Sushi: The Sushi dataset 20, as partially shown in FIG. 2, consists of 5000 full rankings over 10 varieties of sushi indicating sushi preferences (Kamishima et al., 2005). The experiment used 3500 preferences for training and 1500 for validation. EM experiments were run by generating revealed paired comparisons for training with various probabilities $\propto$. To mitigate issues with local maxima the experiment was run on the present invention EM ten times (more than is necessary) for each instance. FIGS. 2a-2c, tables 20-24, show that, even without full preferences, EM may learn well even with only 30-50% of all paired comparisons, though it may degrade significantly at 20%, in part because only 10 items are ranked (still performance at 20% is good when K=1, 2). With K=6 components a good fit may be found when training on full preferences: FIG. 2 shows the learned clusters (all with reasonably low dispersion), illustrating interesting patterns (e.g., fatty tuna strongly preferred by all but one group; strong correlation across groups in preference/dispreference for salmon roe and sea urchin (atypical "fish"): and cucumber roll consistently dispreferred).

Movielens: The experiments applied the EM algorithm and calculations of the present invention to a subset of the Movielens dataset (see www.grouplens.org) to find "preference types" across users. 200 (out of roughly 3900) of the most frequently rated movies were used, as were the ratings of the 5980 users (out of roughly 6000) who rated at least one of these. Integer ratings from 1 to 5 were converted to pairwise preferences in the obvious way (for ties, no preference was added to v). 3986 preferences were used for training and 1994 for validation. The present invention ran EM with number of components K=1, . . . , 20; for each K the present invention was ran EM 20 times to mitigate the impact of local maxima (a lot more than necessary). For each K, the average log likelihood of the best run on the validation set to select K was evaluated. Log likelihoods were approximated using the Monte Carlo estimates (with K*T 120). The C++ implementation of the algorithms and calculations of the present invention gave EM wall clock times of 15-20 minutes (Intel™ Xeon dual-core, 3 GHz), certainly practical for a data set of this size. Log likelihood results are shown in FIG. 2 24 as a function of the number of mixture components. This suggests that the best component sizes are K=10 and K=5 on the validation set.

The present invention can incorporate a variety of sets of algorithms and calculations to support the efficient and effective learning of ranking or preference distributions when observed data comprise a set of unrestricted pairwise comparisons of items. Given the fundamental nature of pairwise comparisons in revealed preference, the present invention may include methods that extend the reach of rank learning in a vital way. In particular, the GRIM algorithm may allow sampling of arbitrary distributions, including Mallows models conditioned on pairwise data. It may support a tractable approximation to the #P-hard problem of log likelihood evaluation of Mallows mixtures: and may form the heart of an EM algorithm or calculation that experiments have shown to be effective. GRIM may also be used for non-parametric estimation.

General System Implementation

Figure 5:
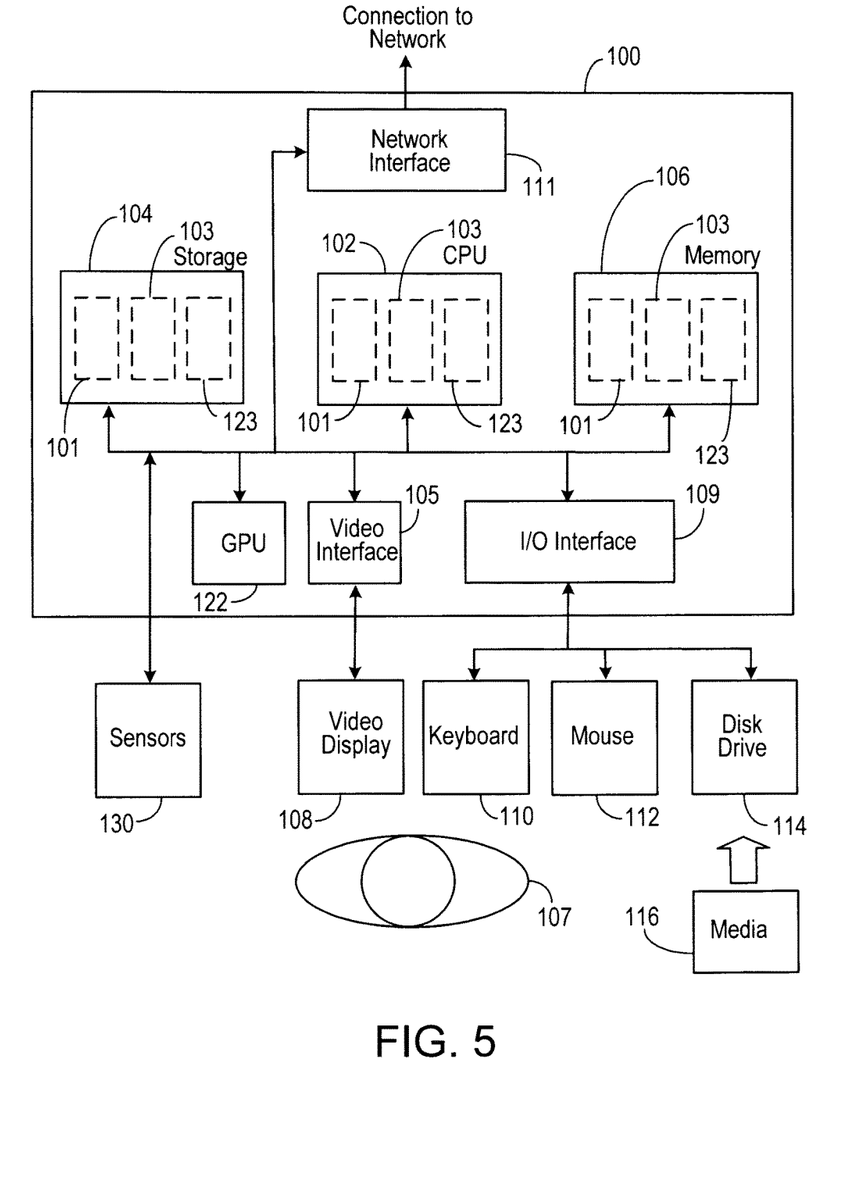
FIG. 5 is a generic system diagram illustrating an implementation of the invention.

The present system and method may be practiced in various embodiments. A suitably configured computer device, and associated communications networks, devices, software and firmware may provide a platform for enabling one or more embodiments as described above. By way of example, FIG. 5 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 130 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

It will be appreciated by those skilled in the art that other variations of the embodiments described herein may also be practiced without departing from the scope of the invention. Other modifications are therefore possible.

We claim:

1. A computer implemented method of identifying and ranking preferences regarding a plurality of interests, for a given group of users, the method comprising:
    obtaining from one or more data sources, a reference ranking based on user preference information including partial preference information for the given group of users, wherein the partial preference information includes a set of inferred interest preferences based on pairwise comparisons of items selected by users in the given group and other items that were not selected by the users in the group;
    analyzing, by operation of one or more server computers, the pairwise comparisons including, iteratively reordering the reference rankings based on various insertion vectors to generate a distribution to learn one or more statistical models for inferring and ranking a set of preferences for the given group of users based on partial preference information; and
    generating a recommendation for at least one of the users in the given group of users based on the one or more statistical models.

2. The method of claim 1, wherein the one or more statistical models are selected to fit with the partial preference information.

3. The method of claim 1, wherein a plurality of mixtures of statistical models for inferring and ranking preferences is selected, thus enabling the formation of clusters consisting of probabilistic distributions applied to segments of the group.

4. The method of claim 1, comprising the further step of automatically determining:
    a series of model parameters that best fit the available preference information for selecting one or more statistical models that best fits the preference information; and
    based on the model parameters, selecting one or more applicable statistical models.

5. The method of claim 4, comprising predicting unobserved preferences of specific members.

6. The method of claim 4, wherein the model parameters are inferred given observations of user behavior, survey data, or implicit choice data, and the model parameters consists of inferred clusters of users, or preference types, based on partial preference data.

7. The method of claim 1 wherein the one or more statistical models include a Mallows model for specifying a probability distribution over a ranking of the choices.

8. The method of claim 7, wherein the Mallows model is specified by a mean ranking reflecting the average preferences of the group plus a dispersion parameter representing the variability of preferences in the group.

9. The method of claim 1, wherein the preference information is obtained from one or more of: user ratings or comparisons of products/services on an explicit basis; and user actions such as product selections, social media interactions or clicking on web links, past survey responses, on an implicit basis.

10. The method of claim 1, wherein identifying the preferences enables the prediction of the preferences; using the pairwise comparisons and application of a Mallows model/mixture.

11. A computer network implemented system for identifying and ranking preferences regarding a plurality of interests, for a given group of users, the system comprising:
    one or more server computers having at least one processor, connected to an interconnected network of computers, and linked to a server application;
    the server application includes or is linked to an preference inference engine that:
        obtain from one or more data sources, a reference ranking based on user preference information including partial preference information for the given group of users, wherein the partial preference information includes a set of inferred interest preferences based on pairwise comparisons of items selected by users in the given group and other items that were not selected by the users in the group;
        analyze, by operation of one or more server computers, the pairwise comparisons including, iteratively reordering the reference rankings based on various insertion vectors to generate a distribution to learn one or more statistical models for inferring and ranking a set of preferences for the given group of users based on partial preference information; and
        generate a recommendation for at least one of the users in the given group of users based on the one or more statistical models.

12. The system of claim 11, wherein the one or more statistical models are selected to fit with the partial preference information.

13. The system of claim 11, wherein the server application is operable to automatically determine:

a series of model parameters that best fit the available preference formation for selecting one or more statistical models that best fits the preference information;

based on the model parameters selecting one or more applicable statistical models; and the inference engine applying the selected one or more applicable statistical models so as to infer a preference set or preference ranking.

14. The system of claim 11, wherein the inference engine is operable to predict unobserved preferences of specific members.

15. The system of claim 11, wherein the one or more statistical models include a Mallows model for specifying a probability distribution over a ranking of the choices.

16. The system of claim 15, wherein the Mallows model is specified by a mean ranking reflecting the average preferences of the group plus a dispersion parameter representing the variability of preferences in the group.

17. The system of claim 11, operable to enable the prediction of the preferences, by applying a Mallows model/mixture to the pairwise comparisons.

* * * * *